July 12, 1960            A. HANSEN            2,944,653
CONVEYOR ARRANGEMENT IN PLANTS FOR MOULDING
CHOCOLATE AND SIMILAR MASSES
Filed Nov. 1, 1954
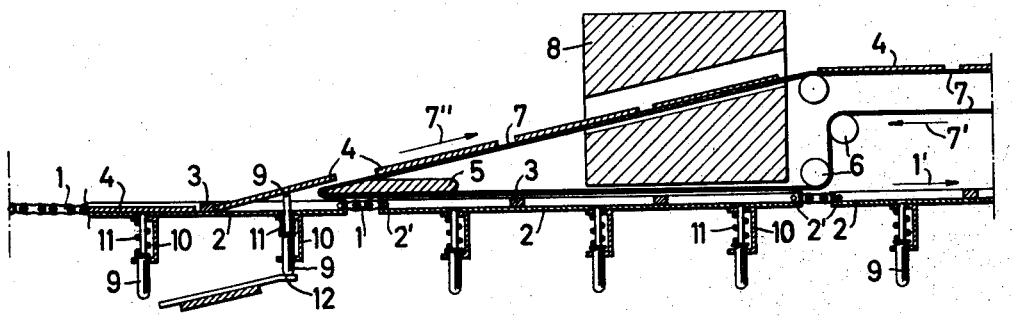
INVENTOR
A. Hansen
BY Wenderoth, Lind & Ponack
ATTORNEYS 2,944,653
CONVEYOR ARRANGEMENT IN PLANTS FOR MOULDING CHOCOLATE AND SIMILAR MASSES Asgar Hansen, Herlev, Denmark, assignor to Mikrovaerk A/S, Soborg, Denmark
Filed Nov. 1, 1954, Ser. No. 465,907
Claims priority, application Denmark Nov. 10, 1953
3 Claims. (Cl. 198—20)

This invention relates to a confectionary moulding plant and more particularly to a transfer mechanism between a first and a second conveyor. The first conveyor comprises a series of interhinged carriages each of which has at least one pocket to receive a separate plate to support the moulded articles, and the second conveyor comprises an endless band extending to a point slightly above the first conveyor to receive a plate therefrom.

An object of the invention is to provide a transfer mechanism which is cheap and simple and which has a minimum of movable elements to make possible a controlled transfer of the plates from the first conveyor to the second conveyor so that the transfer operations are always strictly coordinated with the travelling speed of the first conveyor.

Another object of the invention is to provide a transfer mechanism in which the motion of the movable transfer elements is derived directly from the travelling motion of the first conveyor.

Another object of the invention is to provide a transfer mechanism so that at the transfer point the plates remain in engagement with the first conveyor until they are securely received by the second conveyor so that the first conveyor is operative to push the plates onto the second conveyor.

With these and other objects in view the invention consists of the arrangements and means defined in the appended claims and more fully described with reference to the drawing which is a partial diagrammatical vertical longitudinal sectional view at the transition point where the articles are moved from one conveyor to the other.

A carriage conveyor driven by a pair of endless chains 1 passes underneath a mould belt, not shown, of a confectionary moulding plant, so that the moulded articles may by gravity or otherwise be transferred from the moulds to the carriage conveyor. The carriages 2 of the conveyor are each hingedly connected by means of pins 2' to the chains 1 so as to form a succession of inter-hinged carriages which during the travel of the chains are advanced along a horizontal path in the direction of the arrow 1' and are returned along a lower run, not shown.

Each carriage 2 comprises a flat tray which has a number of transverse rails 3 thereby forming compartments or pockets, in each of which a plate 4 may be received.

At a slight distance above the path of the carriages 2 a transverse rule 5 is mounted which consists of a rigid material having a hard and smooth surface. Around this rule and over guiding rollers 6, a belt 7 of pliable material is carried, which during the operation of the plant runs in the direction indicated by the arrows 7' and 7". A metal detector 8 through which the plates 4 pass with the articles resting thereon, serves for detecting metallic foreign matter, if any, in the moulded articles.

The invention provides means operable to transfer the plates 4 with the articles carried thereon from the carriages 2 to the belt 7. A stationary inclined guiding rail 12 carried by the frame, not shown, cooperates with a number of raising pins 9 associated with the carriage conveyor. A pin 9 is provided for each of the pockets of the carriage 2 and is guided for vertical displacement in a bracket 10 mounted on the lower surface of the carriage at a point intermediate the side edges thereof and nearer to the forward than the rear end of the associated pocket. A spring 11 urges the pin 9 to its lower inoperative position in which the upper end of the pin lies below or is flush with the level of the bottom of the carriage.

The stationary guide rail 12 is disposed at a slight distance from the front edge of the rule 5, so that when a lifting pin 9 approaches the rule 5, the lower end of this pin engages the guide rail 12. Due to the inclination of this rail the pin is raised against the force of the spring 11 and, accordingly, the leading edge portion of the plate 4 is by the pin 9 raised to overlie the belt 7 on the rule 5. Just before the pin 9 reaches the belt 7, the lower end of the pin slides over the forward end of the guide rail 12, and the pin is immediately by its spring 11 returned to inoperative position. This causes the leading edge portion of the plate 4 to fall down onto the belt 7, and during the continued motion of the carriage 2 in the direction of the arrow 1' the rail 3 forming the rear wall of the pocket in which the particular plate 4 is received pushes the plate further forwards on the belt 7. Preferably, the travelling speed of this belt 7 or second conveyor is slightly higher than that of the first conveyor formed by the carriages 2, and at a certain point the plate 4 will therefore be pulled away by the belt 7 from the transverse rail 3, so that it cannot get jammed between both conveyors.

After having passed through the metal detector 8 the plates 4 may be removed from the belt conveyor 7, and when the articles have been removed from the plates these may again be placed in the pockets of the carriages 2.

I claim:

1. In a confectionary mass moulding plant, the combination comprising a first conveyor having a series of interhinged carriages each having at least one pocket to receive at least one separate plate to support the moulded articles and each further having a raising device operative to engage and raise the leading edge portion of said plates from the bottom of said pockets while the trailing edge portion of said plates is still in engagement with said bottom, a second endless conveyor extending to a point slightly above said first conveyor to receive said plates therefrom, and a stationary structure to successively operate the raising devices of said carriages shortly before said leading edge portions arrive at the transfer region between both conveyors and to allow said devices to return to their bottom position.

2. A confectionary mass moulding plant as set forth in claim 1, wherein the travelling speed of said second conveyor is higher than that of said carriages.

3. A confectionary mass moulding plant as set forth in claim 1, wherein each of said raising devices comprises a pin guided for vertical movement relative to the carriage and having a lower end portion projecting below said carriage to cooperate with a stationary inclined guide surface extending almost to said transfer region.

References Cited in the file of this patent
UNITED STATES PATENTS

| | | |
|---|---|---|
| 423,946 | Paris | Mar. 25, 1890 |
| 1,319,190 | Van Houten | Oct. 21, 1919 |
| 1,429,093 | Paranteau | Sept. 12, 1922 |
| 2,168,419 | Paterson | Aug. 8, 1939 |
| 2,679,919 | DeKoning | June 1, 1954 |
| 2,738,868 | Comstock | Mar. 20, 1956 |

FOREIGN PATENTS

| | | |
|---|---|---|
| 110,342 | Australia | Apr. 8, 1940 |